(12) United States Patent
Broadbent

(10) Patent No.: US 6,682,023 B2
(45) Date of Patent: Jan. 27, 2004

(54) CONTIGUOUS VARIABLE CAMBER DEVICE

(76) Inventor: Michael Craig Broadbent, 28 Sullivan Crescent, Brownswood, Milton Keynes MK7 8DN (GB)

( * ) Notice: Subject to any disclaimer, the term of this patent is extended or adjusted under 35 U.S.C. 154(b) by 0 days.

(21) Appl. No.: 10/172,153

(22) Filed: Jun. 14, 2002

(65) Prior Publication Data

US 2002/0195527 A1 Dec. 26, 2002

(30) Foreign Application Priority Data

Jun. 15, 2001 (GB) .............................................. 0114634

(51) Int. Cl.⁷ ................................................. B64C 3/44
(52) U.S. Cl. .......................... 244/219; 244/216; 244/214
(58) Field of Search ................................ 244/219, 216, 244/214, 213, 215, 201

(56) References Cited

U.S. PATENT DOCUMENTS

| | | | |
|---|---|---|---|
| 1,353,666 A | 9/1920 | Page ........................... | 244/214 |
| 1,394,344 A | 1/1921 | Page ........................... | 244/214 |
| 3,847,369 A | 11/1974 | Phillips et al. ............... | 244/214 |
| 4,399,970 A * | 8/1983 | Evans ......................... | 244/214 |
| 5,044,580 A | 9/1991 | Williams ..................... | 244/214 |
| 5,474,265 A * | 12/1995 | Capbern et al. ............. | 244/214 |
| 5,566,910 A * | 10/1996 | Diekmann et al. ........... | 244/216 |
| 5,651,513 A | 7/1997 | Arena ........................ | 244/75 R |
| 5,927,656 A * | 7/1999 | Hinkleman ................. | 244/203 |
| 6,015,117 A | 1/2000 | Broadbent ................... | 244/214 |
| 6,299,108 B1 | 10/2001 | Lindstrom et al. .......... | 244/213 |
| 6,454,219 B1 * | 9/2002 | Moe ........................... | 244/214 |

FOREIGN PATENT DOCUMENTS

| | | |
|---|---|---|
| DE | 697606 | 9/1940 |
| EP | 0 188 823 A1 | 7/1986 |
| EP | 0 322 172 A2 | 6/1989 |
| EP | 0 818 387 A1 | 1/1998 |
| GB | 298508 | 10/1928 |
| GB | 2 096 551 | 10/1982 |
| GB | 2 138 756 | 10/1984 |
| GB | 2 186 849 A | 8/1987 |
| GB | 2 204 538 A | 11/1988 |
| GB | 2 260 521 B | 4/1993 |
| GB | 2 323 577 A | 9/1998 |
| WO | WO 96/09955 | 4/1996 |

\* cited by examiner

*Primary Examiner*—J. Woodrow Eldred
(74) *Attorney, Agent, or Firm*—Fay, Sharpe, Fagan, Minnich & McKee, LLP

(57) ABSTRACT

A wing includes a main wing section and a moveable wing surface that is adjustable relative to an adjacent edge of the main wing section to alter the camber of the wing. The adjacent edge of the main wing section is shaped such that the moveable wing surface remains substantially in contact with the main wing section when the moveable wing surface is positioned between a fully retracted condition and a partially deployed condition, and a slot is provided between the moveable wing surface and the main wing section when the moveable wing surface is positioned between the partially deployed condition and a fully deployed condition.

15 Claims, 5 Drawing Sheets

CONTIGUOUS VARIABLE CAMBER DEVICE

The present invention relates to a system for deploying moveable wing surfaces, for example aircraft slats and flaps.

Various mechanisms have been proposed for deploying slats and flaps, including paired track systems, Kruger flap systems and swing arm systems. The present invention is applicable to a swing arm system, for example of the general type described in International patent application No: PCT/NZ95/00096, the content of which is incorporated by reference herein. The invention is also applicable to other deployment systems including, for example, the system described in U.S. Pat. No. 5,651,513 (Arena), the content of which is also incorporated herein by reference, which employs a torsion bar and sway bar mechanism. The deployment system may be used for deploying slats or flaps and in the following description references to slat deployment systems are intended to include flap deployment systems, and vice versa.

During takeoff, the best condition for the wing is to have high camber, but low drag.

During landing, drag is not such a concern, but high lift and low speed are priorities. During cruise, minimising drag is the highest priority. Lift coefficients are much lower, as speed is much greater; therefore camber is very low.

During a long flight the weight of an aircraft will change significantly causing the need for the wings to vary their lift, given the same speed and altitude. The normal method to do this is to change the angle of attack: the angle of the wing plane to the horizon. However, this necessarily causes the profile of the aircraft to increase, with detrimental affects to the drag and fuel burn.

One way to minimise drag whilst changing the lift coefficient of the wings is to employ variable camber to the wing. The variation of camber can best be achieved when both surfaces are contiguous, giving minimum drag. Variable camber can be achieved at either the leading or trailing edge, or both.

For landing, providing a slot in the wing surface ensures airflow attachment to the top surface with high angles of attack. This provides high lift but at the cost of high drag. This can be beneficial during landing, to ensure low speed and controlled descent.

For take-off it is most important to gain speed and the additional drag of a slot is not beneficial. In fact it is normal to deploy less camber due to the penalties of lift induced drag.

It is an object of the present invention to mitigate at least some of the above problems, or at least provide an alternative to the current systems.

According to a first aspect of the present invention there is provided a wing including a main wing section and a moveable wing surface that is adjustable relative to an adjacent edge of the main wing section to alter the camber of the wing, wherein the adjacent edge of the main wing section is shaped such that the moveable wing surface remains substantially in contact with the main wing section when the moveable wing surface is positioned between a fully retracted condition and a partially deployed condition, and a slot is provided between the moveable wing surface and the main wing section when the moveable wing surface is positioned between the partially deployed condition and a fully deployed condition.

By analysis it is possible to plot the trailing edge of the slat during its motion forward. If this loci of points is used as a template to design the leading edge surface of the main wing, it is possible to ensure a contiguous contact with the trailing edge of the slat for a large proportion of the deployment. If this system of design is used until takeoff position, this ensures low drag throughout this envelope. Further, at maximum deployment of the slat, during landing, the slat loses contact with the leading edge of the main wing, to develop a slot, which permits higher levels of camber, and more lift for a given speed.

This also means that the surface between the slat and main wing only comes into play during landing, when drag losses are less important. Thus, there is less requirement for a smooth, aerodynamic profile between the slat and main wing. Therefore complex shutter mechanisms do not need to be employed to improve the aerodynamics of the flow through the slot.

Advantageously, the moveable wing surface is positioned between a fully retracted condition and the partially deployed condition when the wing is set in a condition suitable for take off or cruising flight, and the moveable wing surface is positioned between the partially deployed condition and a fully deployed condition when the wing is set in a condition suitable for landing.

According to one embodiment of the invention, the moveable wing surface is a slat and the adjacent edge is the leading edge of the main wing section. Advantageously, the upper surface of the main wing section leading edge is shaped to remain substantially in contact with the upper trailing edge of the slat, when the slat is positioned between a fully retracted condition and the partially deployed condition.

The main wing section may include a closure mechanism for closing a gap in the underside of the wing between the main wing section and the moveable wing surface, during at least part of the movement of the moveable wing surface from the fully retracted condition to the partially deployed condition.

According to a second aspect of the present invention there is provided a wing including a main wing section and a moveable wing surface that is adjustable relative to an adjacent edge of the main wing section to alter the camber of the wing, in which the main wing section includes a closure mechanism for closing a gap in the underside of the wing between the main wing section and the moveable wing surface, during at least part of the movement of the moveable wing surface.

The closure mechanism may include a panel hinged to the lower surface of the main wing section. The panel may be resiliently biassed.

The moveable wing surface may include connection means for engaging the closure mechanism during at least part of the movement of the moveable wing surface from the fully retracted condition to the partially deployed condition, to control movement of the panel. The connection means may include a releasable tongue and grove joint.

Alternatively, the wing may include drive means for controlling operation of the closure mechanism.

The moveable wing surface may be connected to the main wing section by a swing arm mechanism or by a sway bar and torsion bar mechanism. Operation of the closure mechanism may then be controlled by one or more links from components of the swing arm mechanism or the sway bar and torsion bar mechanism.

By hinging the lower surface of the main wing near to the front spar and attaching the forward end of that surface to the trailing edge of the slat, it is possible to gain a contiguous lower surface, over a small range of slat movement. This small range is consistent with the needs of variable camber during cruise conditions.

One way of attaching the lower surface of the main wing to the slat trailing edge is by spring force, such that the lower surface of the main wing, the hinged panel, is pushed until it meets the lip of the trailing edge of the slat.

Another method of attaching the lower surface to the slat is to have grove in the slat trailing edge which intersects with a tongue on the lower surface of the hinged panel(s).

The movement of the hinged panel(s) is limited by an end stop, such that when the slat deploys further, for takeoff or landing, a gap appears in the lower surface between the slat and the main wing. On retraction of the slat the trailing edge of the slat re-engages the tongue in the lower surface of the main wing.

Another embodiment would be a fully mechanical deployment system for the hinged panels. If the main slat system were a swing arm type, it would be possible to deploy the hinged panel(s) by a link from the swing arm to the hinged panel.

Embodiments of the invention will now be described, by way of example, with reference to the accompanying drawings, in which.

Figure 1:
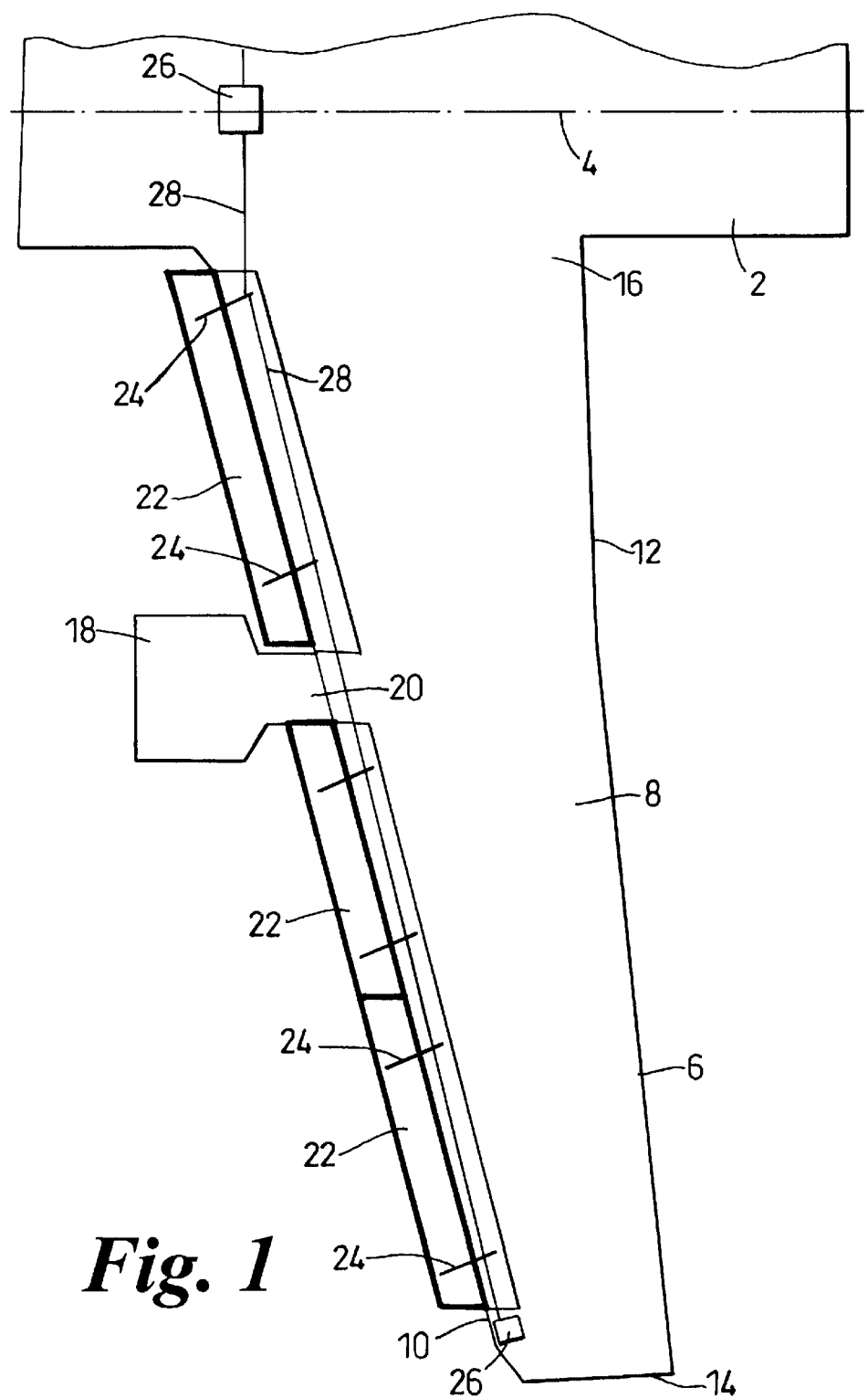
FIG. 1 shows diagrammatically a plan view of a wing with three slats at the leading edge separated by an engine pylon.

Referring first to FIG. 1, the aircraft has a fuselage 2 with a centre line 4. In the drawing, only the port wing 6 is shown: this includes a main wing section 8 having a leading edge 10, a trailing edge 12, a wing tip 14 and a root 16. The wing is tapered, the chord decreasing from the root 16 to the tip 14. An engine 18 is attached to the underside of the main wing section 8 by me and of a pylon 20.

Three slats 22 are attached to the leading edge of the wing by means of swing arm assemblies 24, which may for example by substantially as described in British patent application No. 2362363, the content of which is incorporated by reference herein. The positions of the slats are controlled by motors 26, drive being transmitted to the swing arms by means of a torque shaft 28 and gears (not shown).

Figure 2:
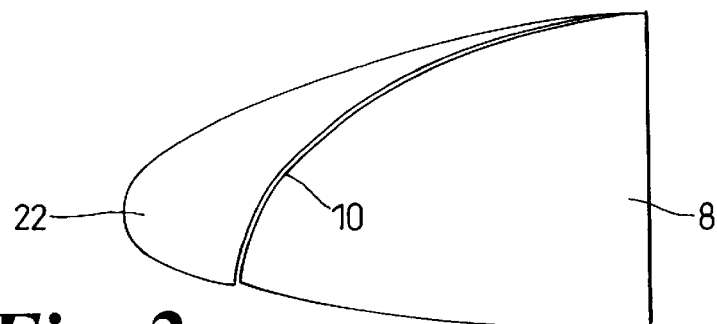
FIG. 2 is a sectional side view of a wing according to a first embodiment of the invention, with the slat in a retracted position.

Referring to FIGS. 2 to 5, the slat 22 is shown in four different positions relative to the main wing section 8. The slat 22 can be moved between these positions by adjusting the swing arm mechanisms. In FIG. 2, the slat 22 is shown in a fully retracted position, which is suitable for normal cruising flight. The slat is then positioned to lie flush against the leading edge 10 of the main wing section 8 with virtually no gap between them. This produces a smooth aerofoil section with low camber and low drag.

Figure 3:
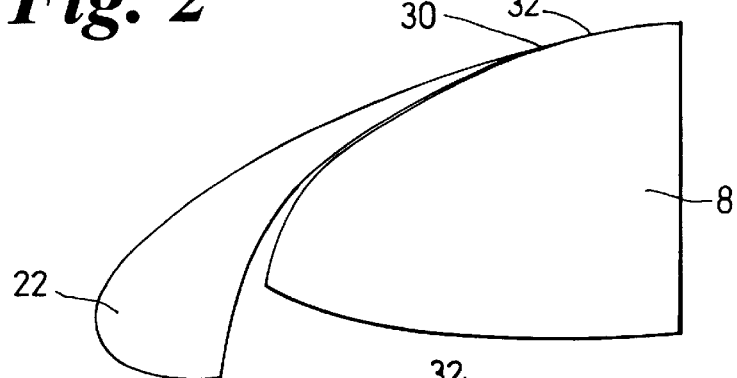
FIG. 3 is a sectional side view of the slat in an early cruise position.

In FIG. 3, the slat 22 is shown in a first partially deployed position, which is suitable for the early part of cruising flight, when the aircraft has a heavy fuel load. The slat 22 has moved forwards and downwards relative to the main wing section 8 from the fully retracted position, increasing the camber and the lift provided by the wing. The leading edge 10 of the main wing section is shaped such that the upper trailing edge 30 of the slat maintains a running contact along the upper surface 32 of the leading edge, to provide a smooth aerofoil section and prevent air flowing between the slat and the main wing section.

Figure 4:
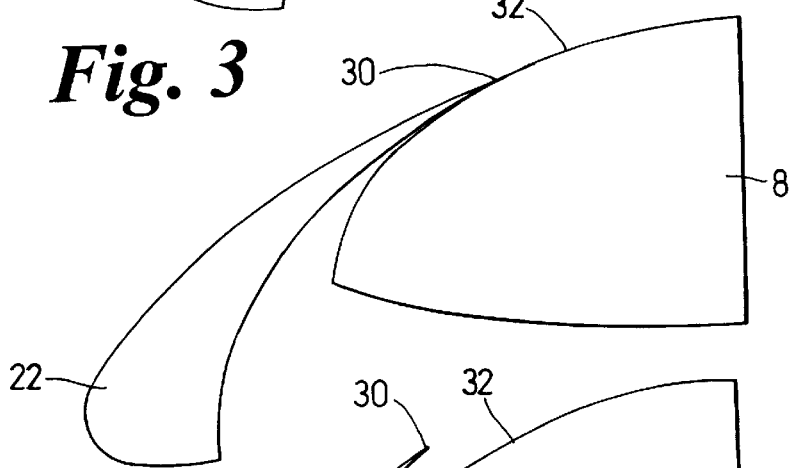
FIG. 4 is a sectional side view of the slat in a takeoff position.

In FIG. 4, the slat 22 is shown in a second partially deployed position, which is suitable for takeoff. The slat has moved further forwards and downwards relative to the main wing section 8, further increasing the camber and the lift provided by the wing. The upper trailing edge 30 of the slat still maintains a running contact along the upper surface 32 of the main wing section leading edge 10, thus providing a smooth aerofoil section.

Figure 5:
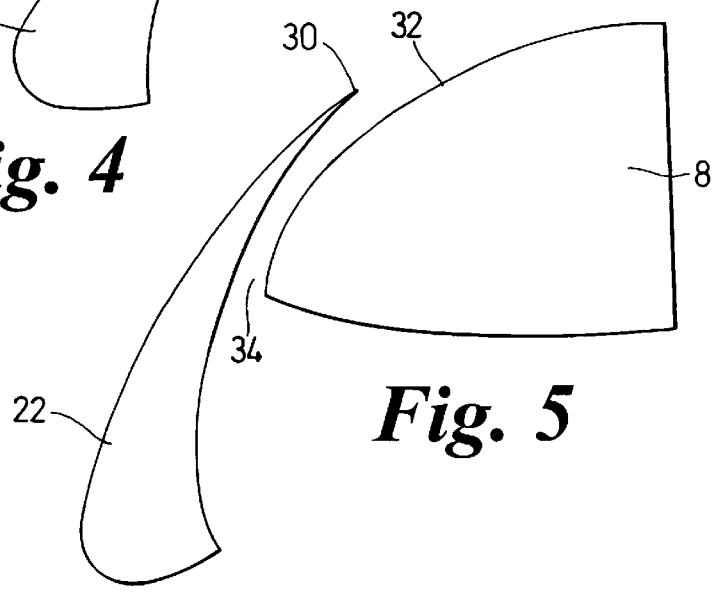
FIG. 5 is a sectional side view of the slat in a landing position.

In FIG. 5, the slat 22 is shown in a fully deployed position for landing. The slat has moved still further downwards and forwards relative to the main wing section 8, increasing the camber of the wing to a maximum. In this position, the upper trailing edge 30 of the slat has moved away from the upper surface 32 of the main wing section leading edge, providing a slot 34 between the slat and the main wing section through which air can flow. This increases turbulence over the upper surface of the wing and prevents separation of the airflow, which provides very high lift and high drag.

Figure 6:
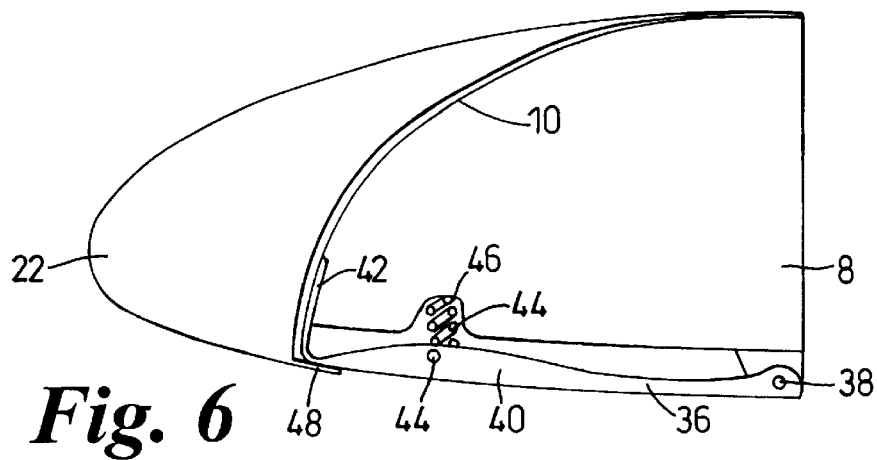
FIG. 6 is a sectional side view of a wing according to a second embodiment of the invention, with the slat in a retracted position.
Figure 7:
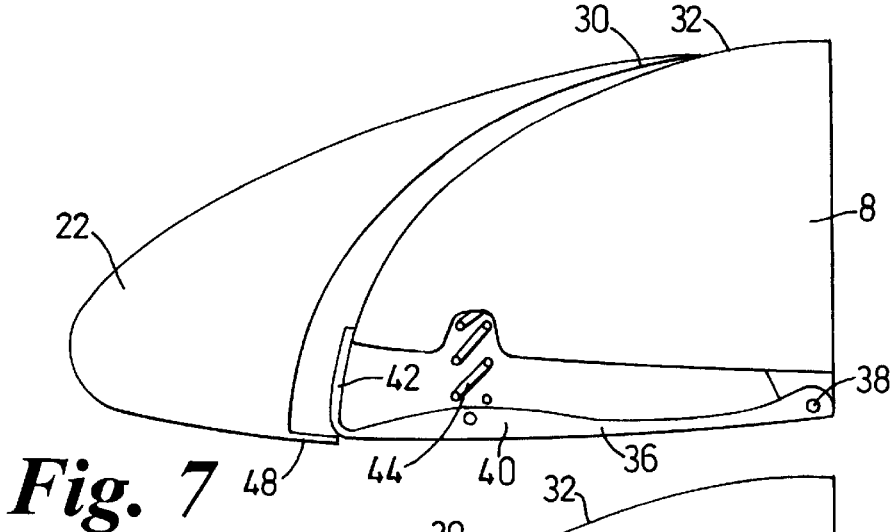
FIG. 7 is a sectional side view, showing the slat in an early cruise position.
Figure 8:
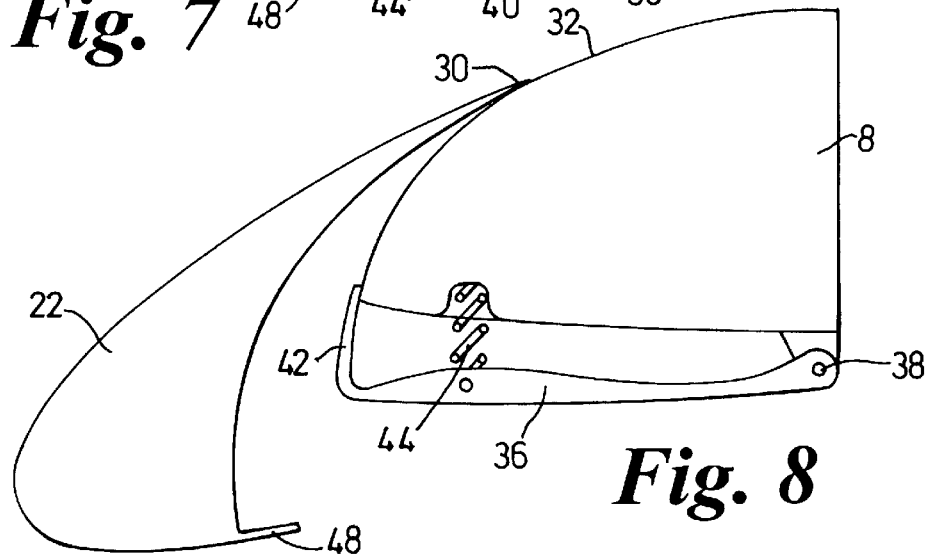
FIG. 8 is a sectional side view, showing the slat in a takeoff position.

Referring to FIGS. 6, 7 and 8, a second embodiment of the invention is shown, in which a panel 36 is joined to the lower surface of the main wing section 8 adjacent the leading edge 10 by a hinge joint 38. The panel 36 includes a lower plate 40 that extends forwards from the hinge joint 38 and forms part of the lower surface of the wing, and a front plate 42 that extends substantially perpendicularly upwards from the front edge of the lower plate 40 and makes a sealing connection with the leading edge 10 of the main wing section. A compression spring 44 is located in a recess 46 in the lower surface of the main wing section 8 and engages the upper surface of the lower plate 40, to urge the panel 36 away from the lower surface of the main wing section 8. A stop member (not shown) limits movement of the panel 36 relative to the wing. The slat 22 includes a lip 48 that extends rearwards from its lower trailing edge, which engages the panel 36 when the slat is in a retracted or only partially deployed position.

When the slat 22 is in a fully retracted position as shown in FIG. 6, the lip 48 engages the underside of the panel 36 and holds it close to the underside of the main wing section 8, so providing a smooth aerofoil profile with low camber and low drag, for normal cruising flight.

When the slat 22 is partially deployed for early cruising flight as shown in FIG. 7, the upper trailing edge 30 of the slat maintains contact with the upper surface 32 of the main wing section leading edge, and the spring 44 urges the panel 36 away from the underside of the main wing section 8 so that it remains in contact with the lip 48. The panel 36 thus closes the gap that in the first embodiment of the invention, as shown in FIG. 3, forms in the underside of the wing, and thereby increases the aerodynamic efficiency of the wing.

When the slat 22 is in a second partially deployed position for takeoff as shown in FIG. 8, the slat is located still further forwards and downwards relative to the main wing section 8. In this position, the lip 48 on the lower trailing edge of the slat loses contact with the underside of the panel. However, the upper trailing edge 30 of the slat still maintains contact with the upper surface 32 of the main wing section leading edge, so preventing air from flowing between the slat 22 and the main wing section 8. In the fully deployed landing position (which is not shown, but is similar to FIG. 5 of the first embodiment), the slat is located still further forwards and downwards, forming a slot between the slat and the main wing section.

Figure 9:
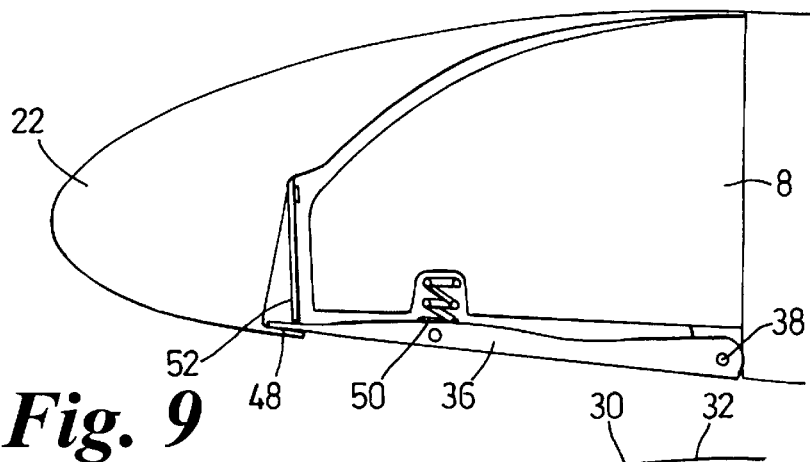
FIG. 9 is a sectional side view of a wing according to a third embodiment of the invention, with a tongue and groove connection, showing the slat in a retracted position.
Figure 10:
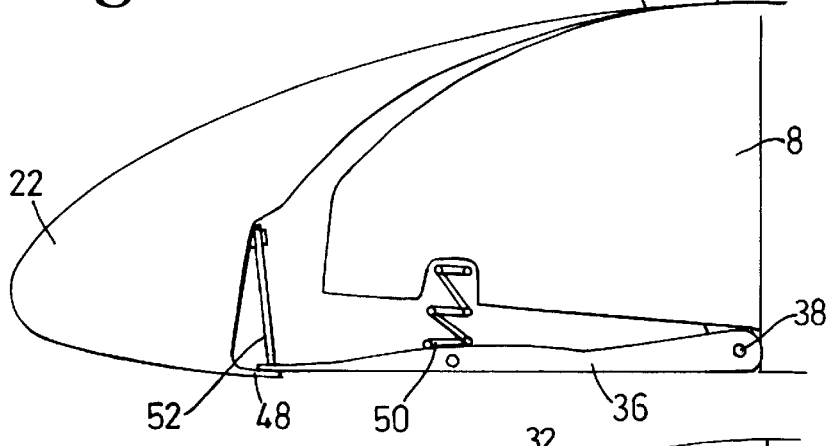
FIG. 10 is a sectional side view in an early cruise position.
Figure 11:
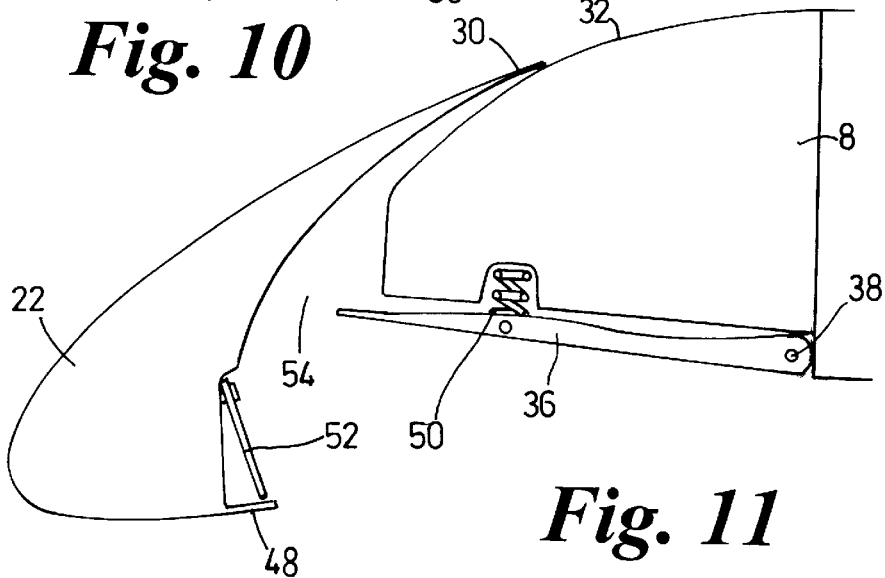
FIG. 11 is a sectional side view in a takeoff position.

Referring to FIGS. 9, 10 and 11, a third embodiment of the invention is shown, in which the panel 36 has a lower plate but no front plate. The panel 36 is joined to the main wing section 8 by a hinge joint 38 and is pulled towards the lower surface of the wing by a tension spring 50. In this embodiment, a further flat spring 52 is attached to the rear face of the slat 22 and extends downwards to engage the upper surface of the front edge of the panel 36 when the slat is in a retracted position. The slat 22 also includes a lip 48 that extends rearwards from its lower trailing edge and engages the lower surface of the front edge of the panel 36 when the slat is in a retracted or only partially deployed position, thus forming with the flat spring 52 a tongue and groove connection between the slat 22 and the main wing section 8.

When the slat 22 is in a fully retracted position as shown in FIG. 9, the lip 48 engages the underside of the panel 36, providing a smooth aerofoil profile with low camber and low drag, for normal cruising flight.

When the slat 22 is partially deployed for early cruising flight as shown in FIG. 10, the upper trailing edge 30 of the slat maintains contact with the upper surface 32 of the main wing section 8, and the flat spring 52 pushes the panel 36 away from the underside of the main wing section 8, against the action of the tension spring 50, so that it remains in contact with the lip 48. The panel 36 thus remains in sealing engagement with the slat 22, increasing the aerodynamic efficiency of the wing.

When the slat 22 is in a second partially deployed position for takeoff as shown in FIG. 11, the front edge of the panel 36 loses contact with the flat spring 52 and the panel is then drawn upwards against the underside of the main wing section 8 by the tension spring 50. The upper trailing edge 30 of the slat 22 maintains contact with the upper surface 32 of the main wing section 8, to prevent air flowing between the slat and the main wing section.

In the fully deployed landing position (which is not shown, but is similar to FIG. 5 of the first embodiment), the slat 22 is located still further forwards and downwards, forming a slot 54 between the slat 22 and the main wing section 8. When the slat 22 returns to the retracted position, the flat spring 52 is pushed against the inner surface of the slat 22 by the end of the panel 36 and then rides over the front edge of the panel until it can return to its natural flat state, in which it engages the upper surface of the front edge of the panel, as shown in FIG. 9.

Figure 12:
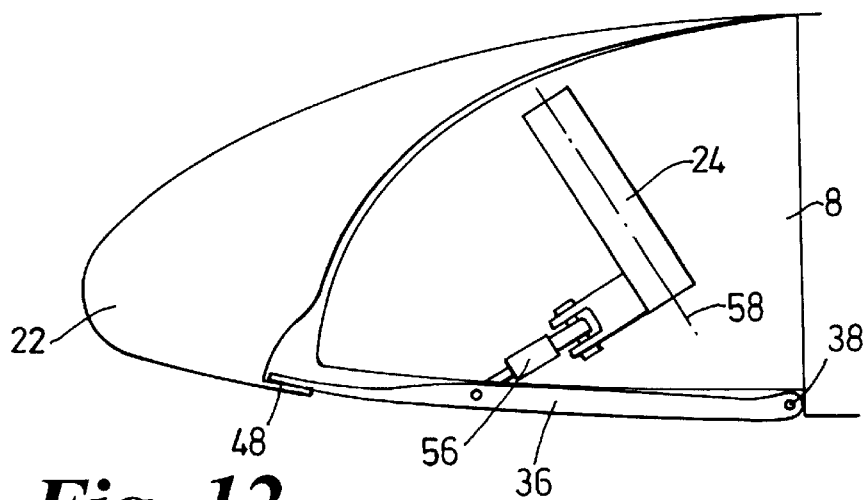
FIG. 12 is a sectional side view of a wing according to a fourth embodiment of the invention with a mechanically-linked hinged panel, showing the slat in a retracted position.
Figure 13:
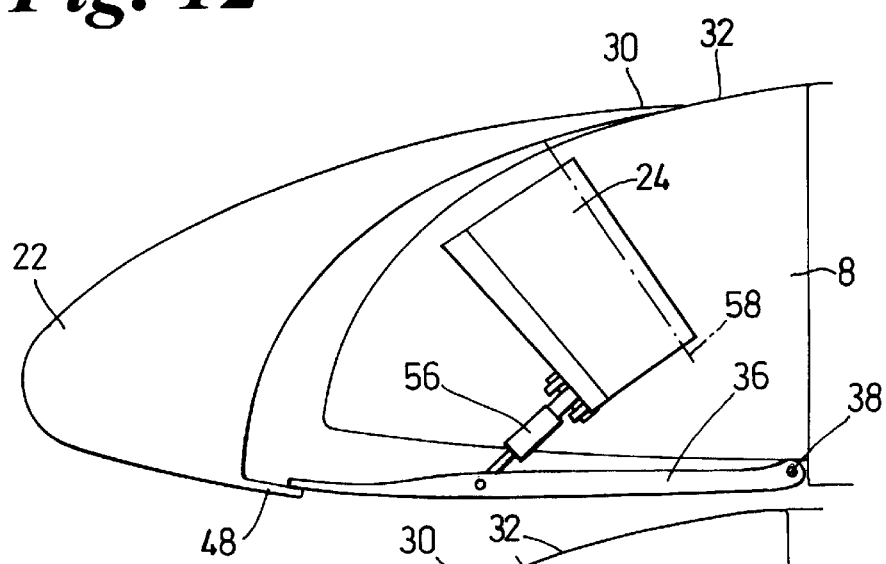
FIG. 13 is a sectional side view in an early cruise position.
Figure 14:
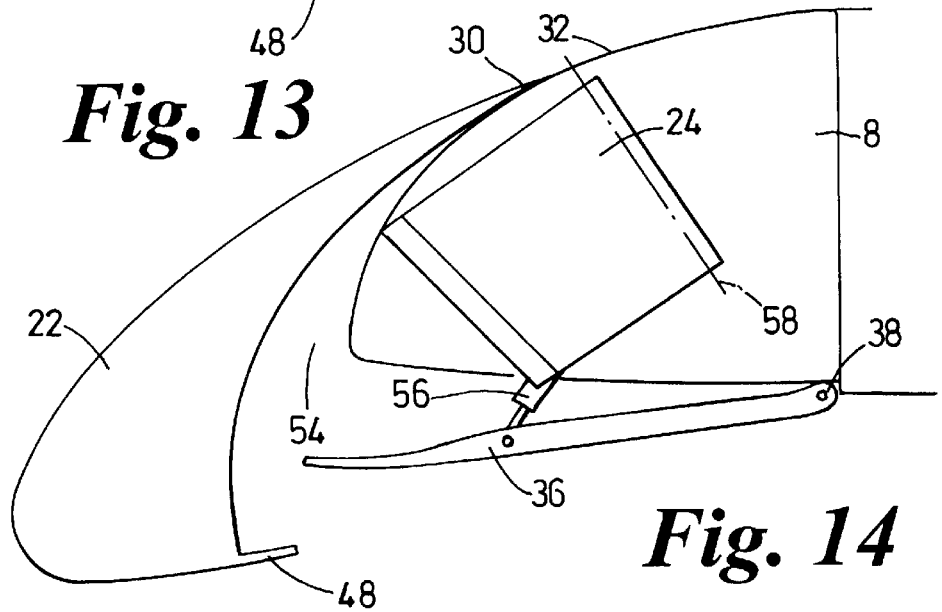
FIG. 14 is a sectional side view in a takeoff position.

Referring to FIGS. 12, 13, and 14 a fourth embodiment of the invention is shown, in which a panel 36 similar to that shown in FIGS. 9 to 11 is hinged to the main wing section at joint 38. Motion of the panel 36 is controlled by a pivot link 56 from one or both of the swing arms 24. The slat 22 again includes a lip 48 that extends rearwards from its lower trailing edge and engages the lower surface of the front edge of the panel 36 when the slat 22 is in a retracted or only partially deployed position.

When the slat 22 is in a fully retracted position as shown in FIG. 12, the lip 48 engages the underside of the panel 36, providing a smooth aerofoil profile with low camber and low drag, for normal cruising flight.

For early cruising flight, the swing arms 24 rotate about their pivot axes 58, moving the slat 22 to the partially deployed position shown in FIG. 13, in which the upper trailing edge 30 of the slat maintains contact with the upper surface 32 of the main wing section. At the same time, the links 56 move the panel 36 downwards, so that it remains in contact with the lip 48.

For takeoff, the swing arms 24 rotate further, moving the slat 22 to the second partially deployed position shown in FIG. 14, in which it is located still further forwards and downwards relative to the main wing section 8. In this position, the lip 48 loses contact with the underside of the panel 36. The panel is held in this position by the links 56. In the fully deployed landing position (not shown), the slat 22 is located still further forwards and downwards, leaving a slot 54 between the slat and the main wing section.

Therefore, as the swing arms 24 rotate about their axes, the links 56 control the positions of the slat 22 and the panel 36. During initial deployment this control allows for a sliding contact between the lip 48 at the lower trailing edge of the slat 22 and the bottom forward end of the panel 36 giving a contiguous surface. As the slat 22 deploys further, the panel 36 remains in a low position to provide a large hole in the leading edge of the main wing section 8, thus allowing the swing arms 24 to deploy through the leading edge of the main wing section.

Various modifications of the invention are of course possible and will be apparent to a person skilled in the art. In particular, the invention is applicable to a deployment system as described in U.S. Pat. No. 5,651,513 (Arena), which employs a torsion bar and sway bar mechanism. In that case, operation of the closure mechanism may be controlled by one or more links from either the sway bar or the torsion bar. Furthermore, it should be noted that the invention is applicable both to slats provided at the leading edge of a wing and also to trailing edge flaps.

What is claimed is:

1. A wing including a main wing section and a moveable wing surface that is adjustable relative to an adjacent edge of the main wing section to alter the camber of the wing, wherein the adjacent edge of the main wing section is shaped such that the moveable wing surface remains substantially in contact with the main wing section when the moveable wing surface is positioned between a fully retracted condition and a partially deployed condition, and a slot is provided between the moveable wing surface and the main wing section when the moveable wing surface is positioned between the partially deployed condition and a fully deployed condition, in which the main wing section includes a closure mechanism for closing a gap in the underside of the wing between the main wing section and the moveable wing surface during at least part of the movement of the moveable wing surface from the fully retracted condition to the partially deployed condition, the closure mechanism includes a resiliently biased panel hinged to the lower surface of the main wing section, and the moveable wing surface includes connection means for engaging the closure mechanism during at least part of the movement of the moveable wing surface from the fully retracted condition to the partially deployed condition, to control movement of the panel.

2. A wing according to claim 1, in which when the wing is set in a condition suitable for take off or cruising flight the moveable wing surface is positioned between a fully retracted condition and the partially deployed condition, and when the wing is set in a condition suitable for landing the moveable wing surface is positioned between the partially deployed condition and a fully deployed condition.

3. A wing according to claim 1, in which the moveable wing surface is a slat and the adjacent edge is the leading edge of the main wing section.

4. A wing according to claim 1, in which the connection means includes a releasable tongue and grove joint.

5. A wing according to claim 1, including drive means for controlling operation of the closure mechanism.

6. A wing according to claim 1, in which the moveable wing surface is connected to the main wing section by a swing arm mechanism or by a sway bar and torsion bar mechanism.

7. A wing according to claim 6, in which operation of the closure mechanism is controlled by one or more links from components of the swing arm mechanism or the sway bar and torsion bar mechanism.

8. A wing including a main wing section and a moveable wing surface that is adjustable relative to an adjacent edge of the main wing section to alter the camber of the wing, in which the main wing section includes a closure mechanism for closing a gap in the underside of the wing between the main wing section and the moveable wing surface, during at least part of the movement of the moveable wing surface, the moveable wing surface includes connection means for engaging the closure mechanism during at least part of the movement of the moveable wing surface to control movement of the panel and the connection means includes a releasable tongue and groove joint.

9. A wing according to claim 8, in which the closure mechanism includes a panel hinged to the lower surface of the main wing section.

10. A wing according to claim 9, in which the panel is resiliently biassed.

11. A wing according to claim 8, including drive means for controlling operation of the closure mechanism.

12. A wing according to claim 8, in which the moveable wing surface is connected to the main wing section by a swing arm mechanism or by a sway bar and torsion bar mechanism.

13. A wing according to claim 12, in which operation of the closure mechanism is controlled by one or more links from components of the swing arm mechanism or the sway bar and torsion bar mechanism.

14. A wing including a main wing section and a moveable wing surface that is adjustable relative to an adjacent edge of the main wing section to alter the camber of the wing, wherein the adjacent edge of the main wing section is shaped such that the moveable wing surface remains substantially in contact with the main wing section when the moveable wing surface is positioned between a fully retracted condition and a partially deployed condition, and a slot is provided between the moveable wing surface and the main wing section when the moveable wing surface is positioned between the partially deployed condition and a fully deployed condition, in which the moveable wing surface is a slat and the adjacent edge is the leading edge of the main wing section, the main wing section includes a closure mechanism for closing a gap in the underside of the wing between the main wing section and the moveable wing surface, during at least part of the movement of the moveable wing surface from the fully retracted condition to the partially deployed condition and the closure mechanism includes a panel hinged to the lower surface of the main wing section.

15. A wing according to claim 14, in which the panel in resiliently biased.

* * * * *